United States Patent [19]

Ogawa

[11] Patent Number: 4,458,860
[45] Date of Patent: Jul. 10, 1984

[54] ROTARY WING AIRCRAFTS

[76] Inventor: Koji Ogawa, No. 7-11, Narihara-machi, Ashiya-shi, Hyogo-ken, Japan

[21] Appl. No.: 500,428

[22] Filed: Jun. 2, 1983

Related U.S. Application Data

[63] Continuation of Ser. No. 272,680, Jun. 11, 1981, abandoned, which is a continuation of Ser. No. 017,548, Mar. 5, 1979, abandoned, which is a continuation of Ser. No. 752,617, Dec. 20, 1976, abandoned.

[30] Foreign Application Priority Data

Dec. 26, 1975 [JP] Japan .................................. 50-157244

[51] Int. Cl.³ ........................ B64B 27/06; B64B 27/38
[52] U.S. Cl. ................................................. 244/17.11
[58] Field of Search ........................... 244/17.11, 17.27; 416/141, 244, 232, 226, 233, 145, 22, 102, 115

[56] References Cited

U.S. PATENT DOCUMENTS

| | | | |
|---|---|---|---|
| 2,521,012 | 9/1950 | Kay et al. | 244/17.11 |
| 2,576,105 | 11/1951 | Childs | 416/145 |
| 2,620,882 | 2/1952 | Morain | 416/22 |
| 2,670,051 | 2/1954 | Hohenemser | 416/102 |
| 2,702,601 | 2/1955 | Nagler | 244/17.11 |
| 2,807,870 | 10/1957 | Harness | 416/233 |
| 2,829,721 | 4/1958 | Gebhard | 416/115 |
| 3,029,047 | 4/1962 | Jacobsen et al. | 244/17.11 |
| 3,153,521 | 10/1964 | Laufer et al. | 244/17.11 |
| 3,200,887 | 8/1965 | Ballovre | 416/141 |
| 3,217,811 | 11/1965 | Hibyan et al. | 244/17.27 |
| 3,591,310 | 7/1971 | Moville | 416/244 |

OTHER PUBLICATIONS

Montgomery, "Sikorsky Helicopter Flight Theory for Pilots and Mechanics", 1964, pp. front-44.
Bramwell, *Helicopter Dynamics,* 1976, Halsfed Press, pp. 242-249.
Payne, *Helicopter Dynamics and Aerodynamics,* 1959, McMillan Co., pp. 151, 152, 173-180.
Miller, "Helicopter Control and Stability in Hovering Flight", Jour. of Aero. Sci., 1948, p. 457.

*Primary Examiner*—Galen L. Barefoot
*Attorney, Agent, or Firm*—Fleit, Jacobson, Cohn & Price

[57] ABSTRACT

Rotary wing aircrafts comprise a fuselage having a rotor driving mast extending substantially vertically. A rotor comprising a plurality of rotors is mounted on the mast for at least feathering and flapping movement. The flapping hinge is offset radially outwardly from the axis of rotation. Further, the rotor blades have weights mounted on the outboard tip ends thereof. The arrangement provides a significantly improved controllability of the aircraft.

9 Claims, 9 Drawing Figures

ROTARY WING AIRCRAFTS

This is a continuation of application Ser. No. 272,680 filed June 11, 1981; which is a continuation of application Ser. No. 17,548, filed Mar. 5, 1979; which is a continuation of application Ser. No. 752,617, filed Dec. 20, 1976, all abandoned.

The present invention relates to rotary wing aircrafts and more particularly to rotary wing aircrafts having rotors tiltable with respect to rotor driving masts.

Conventional rotary wing aircrafts include rotors which provide lifts for supporting the aircrafts in air. In most of such rotary wing aircrafts, the rotors are also relied on in producing horizontal thrusts for initiating and sustaining horizontal movement of the aircrafts.

In conventional rotary wing aircrafts, the rotors are mounted, with a very small number of exceptions, in such a manner that it can be tilted with respect to rotor driving masts. For example, in a so-called fully articulated rotor, rotor blades are mounted on a rotor hub for movements about a flapping and a dragging axes as well as about a feathering axis. In operation, each blade assumes a position wherein weight, centrifugal force, aeronautical force and inertia force acting thereon balance each other. When it is desired to produce a horizontal movement, the pitch or feathering angle of the rotor blade is cyclically changed so as to cause a cyclic change in the lift produced by the blade. This causes a cyclic change in flapping angle of the rotor so that the plane of rotor rotation is in effect changed. In a so-called "see-saw" type two blade rotor system, the rotor plane can similarly be tilted with respect to the rotor mast through a cyclic pitch control.

In these known types of rotary wing aircrafts, problems have been experienced in that the aircraft shows only a slow response to an actuation of a control device. For example, when the control device is so actuated that a forward thrust is produced, the cyclic pitch control mechanism is immediately actuated in a desired direction by a desired amount. Then, a cyclic change is produced in the lift on each rotor blade so as to produce a moment for causing tilting of the rotor plane with respect to the rotor mast. Thus, a forward thrust component is produced in the rotor and the aircraft starts to advance. Thereafter, the aircraft fuselage conducts a nose-down movement to some extent to reduce the tilt angle between the rotor plane and the mast. In this manner, it takes a substantial time before the aircraft follows an actuation of the control device.

Further, when the aircraft is in a steady state and the rotor plane is tilted under a turbulence with respect to the rotor mast, such tilt cannot be sensed until the aircraft has started to move from the steady state. Any corrective action for such turbulence can be initiated only after such movement has been sensed.

Another problem in these types of rotors is that although the control device, such as a control stick positively determines the position of the cyclic pitch control mechanism, the tilt angle of the rotor plane with respect to the rotor mast cannot be determined only by the control device but changes in accordance with a change in attitude of the aircraft.

From the above reasons, control of rotary wing aircrafts has been considered very difficult. It has been believed that a time-consuming training is required for training pilots for helicopters.

The present invention has therefore an object to provide a rotary wing aircraft which has one or more tiltable rotors but is easy to control.

Another object of the present invention is to provide a rotary wing aircraft which has an ability of rapid response to a control operation.

A further object of the present invention is to provide a rotary wing aircraft which has tiltable rotor means but in which the tilt angle between the center axis of the rotor plane and the rotor mast can be maintained within a very small range.

Still further object of the present invention is to provide a rotary wing aircraft which has a good controllability as compared with conventional rotary wing aircrafts.

Theoretically, there are various factors which affects the controllability of the rotary wing aircraft. Those are the weight (W) of the aircraft under a standard operating condition, the height (h) or vertical distance between the center of gravity and the center of the rotor plane, the moment of inertia (Io) of the aircraft about the pitching axis passing through the center of gravity, the number of rotor blades (b), the rated operating angular velocity ($\Omega o$) of the rotor, the centrifugal force (Zo) acting on the rotor blade at the rated operating angular velocity ($\Omega o$), the offset distance (e) of the flapping hinge from the rotating axis of the rotor, the mean chord length (C) of the rotor blade, the moment of inertia ($I_R$) of the rotor blade about the flapping hinge, the radius (R) of the rotor, and the density of the air ($\rho o$) under the standard atmospheric condition.

The inventor has found that the values $$K = \frac{1}{I_o}\left( Wh + \frac{b Z_o e}{2} \right) \text{ and}$$

$$\frac{T^2}{4} = 0.032 \times \frac{C^2 \rho o^2 \Omega o^2 R^8}{I_R^2}$$

have very important effects on the controllability. In defining the value T, it has been assumed that the ratio of the lift coefficient of the rotor blade section to the attack angle is 5.73.

More specifically, the ratio $2\sqrt{K}/T$ is of particular importance. With the ratio greater than one, the tilt angle between the rotor plane and the rotor mast can be maintained very small. This means that the aircraft fuselage moves very quickly in response to the tilting movement of the rotor plane so that the controllability of the aircraft is remarkably improved. Further, when a helicopter is subjected to a sudden gust in hovering, the rotor plane may be tilted with respect to the rotor mast under the influence of such gust, however, such tilting movement can be immediately sensed by the pilot and corrective action can be quickly taken. According to a further feature of the present invention, the ultimate angular velocity of the fuselage which is attained by an actuation of the control member such as a swash plate for a unit angle is much smaller than that in conventional helicopters, so that it is possible to actuate the control member by a greater angle than in the conventional helicopters without encountering any danger. This will provide an increased safety to the aircraft. Practically, with the ratio greater than 0.8, a significant improvement on the controllability can be accomplished.

In attaining a larger value of the ratio, the design factors may be determined in such a manner that the item K is increased and/or the item T is decreased. Among the factors which affect the value K, the weight W and the height h are not versatile factors and they must be determined from other design requirements. Similarly, the blade number 6 may be, in large part, determined from the aeronautical or other design requirements. Thus, the centrifugal force Zo and the offset value e must be properly increased in order to increase the value K. For example, the rotor blades may be provided with weights at or in the vicinity of tip ends thereof to obtain increased value of the centrifugal force. Further, the flapping hinge of each rotor blade may be located as far as possible from the rotating axis of the rotor unless there is any objectionable reason.

Among the factors affecting the value T, the density of the air $\rho o$ should be constant. The chord length C of the rotor blade, the rated angular velocity $\Omega o$ and the radius R of the rotor may be, in large part, determined from other design requirements. Therefore, the most effective way for decreasing the value T is to increase the moment of inertia $I_R$ of the rotor about the flapping hinge. A weight provided at or in the vicinity of the rotor blade will be effective to increase the moment of inertia $I_R$ and therefore to decrease the value T.

According to a preferable mode of the present invention, each rotor blade is made of a one-piece construction of an aluminum alloy extrusion. This structure provides an increased centrifugal force and an increased moment of inertia of the rotor blade about the flapping hinge so that the aforementioned ratio $2\sqrt{K}/T$ is increased to a satisfactory level. Further, the one-piece construction of the aluminum alloy extrusion provides an adequate strength to withstand the aeronautical and mechanical forces to which the blade is subjected in use.

In installing a weight on the rotor blade, the weight may not be secured to the rotor blade but simply fitted thereto and maintained in position by a cable or other tension member extending lengthwise in the blade. This arrangement will be advantageous in that the blade itself is not subjected to the centrifugal force acting on the weight and consequently the blade can be of thinner wall construction.

The above and other objects and features of the present invention will become apparent from the following descriptions of preferred embodiments taking reference to the accompanying drawings, in which.

Figure 1:
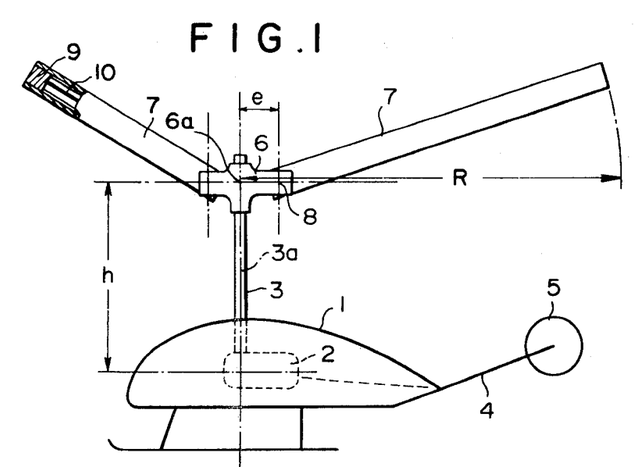
FIG. 1 is a diagrammatical side view of a helicopter embodying the feature of the present invention.

Referring now to the drawings, particularly to FIG. 1, there is schematically shown a helicopter embodying the feature of the present invention. The helicopter comprises a fuselage 1 having an engine 2 mounted thereon. The helicopter 1 further includes a vertically extending mast 3 which is drivingly connected with the engine 2 in a manner well known in the art. The fuselage 1 has a tail boom 4 extending rearwardly therefrom and being equipped with a tail rotor 5. As well known in the art, the tail rotor 5 is also driven by the engine 2.

At the top end of the mast 3, there is secured a rotor hub 6 to which a plurality of rotor blades 7 are installed. In the particular embodiment shown in FIG. 1, three rotor blades 7 are installed on the rotor hub 6 at angularly equi-distant positions. Each of the rotors 7 is mounted on the rotor hub 6 for flapping movement about a flapping axis 8 which is provided by a flapping hinge pin and which is, according to one of the features of the present invention, offset radially outwardly by an offset distance e. The blade 7 is of course mounted on the rotor hub 6 for feathering movement by means of a known mechanism about a feathering axis which extends longitudinally through the blade 7.

The rotor mast 3 and the hub 6 is rotated by means of the engine 2 about a longitudinal axis 3a of the mast 3 and consequently the rotor rotates with a radius R at the angular velocity $\Omega o$. In the illustrated example of the rotor blade 7, a weight 9 is installed at the tip end thereof. The weight 9 is not secured to the rotor blade 7 but simply fitted thereto and connected to the flapping hinge pin by means of a wire 10 extending through the blade 7.

The helicoper has a center of gravity G located substantially on an extension of the longitudinal axis 3a of the mast 3, and the rotor hub 6 which has a center 6a located with a vertical distance h from the center of gravity G.

As previously described, the controllability of a helicopter is affected by the physical values $$K = \frac{1}{I_o}\left( Wh + \frac{bZ_o e}{2} \right) \text{ and}$$

$$\frac{T^2}{4} = 0.032 \times \frac{C^2 \rho o^2 \Omega o^2 R^8}{I_R^2}$$

wherein Io is the moment of inertia of the helicopter about the pitching axis passing through the center of gravity, b the number of rotor blades, $\Omega o$ the rated operating angular velocity of the rotor, Zo the centrifugal force acting on the rotor blade at the rated operating angular velocity, C the mean chord length of the rotor blade, $I_R$ the moment of inertia of the rotor blade about the flapping hinge, and $\rho o$ the density of air under the standard atmospheric condition.

Figures 2, 3:
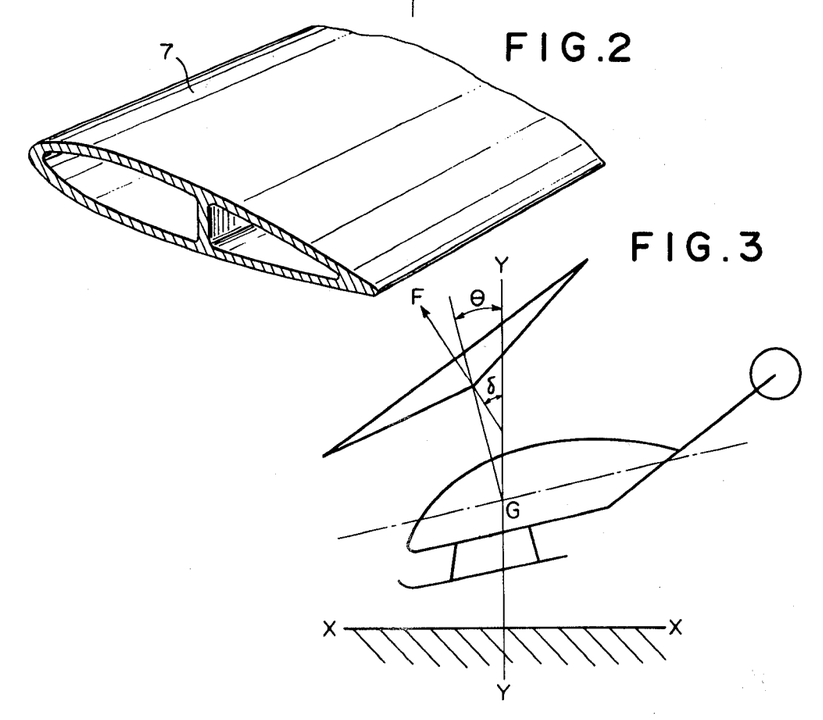
FIG. 2 is a fragmentary perspective view of a rotor blade which may be used in a preferable embodiment of the present invention.
FIG. 3 is a diagrammatical side view of a helicopter in forward flight position.

In the embodiment shown in FIG. 1, the value $2\sqrt{K}/T$ is determined as being greater than 0.8, more preferably greater than 1 by locating the flapping hinge 8 at a position offset from the axis of rotation 3a and mounting the weight 9 at the tip of each rotor blade 7. Further, as shown in FIG. 2, the rotor blade 7 is made of an aluminum alloy extrusion. This is effective to increase the moment of inertia $I_R$ of the rotor blade 7 about the flapping hinge 8 and consequently decrease the value T. Practically, it is preferred that the value K is not smaller than 25 1/sec² and the value T is not larger than 12 1/sec.

In order to show the advantageous features of the present invention, theoretical descriptions will now be made taking reference to FIG. 3. In FIG. 3, the horizontal line of the earth is shown by the line X—X and a line perpendicular thereto by Y—Y. The line of thrust of the rotor is shown by the reference F, the inclination of the thrust line with respect to the line Y—Y by the reference δ, and the inclination of the vertical axis through the center of gravity by the reference θ.

In case of a rotor having rotor blade which are movable about flapping hinges, each of the blades is subjected to the gravitational force due to its own weight, the aeronautical force, the centrifugal force and the inertia force and these forces are balanced so that the moment about the flapping hinge becomes zero.

Thus, the following equation can be established.

$$\ddot{\beta} + 2T\dot{\beta} + \Omega^2\beta = \Omega^2\beta_0 + 2T\Omega(\dot{\theta}+\dot{\phi})\sin\psi \quad (1)$$

where $\psi$ is the angle of rotation of the rotor blade, and $\beta$ the angle of flapping of the blade.
$\Omega$: angular velocity of the rotor
$\theta$: the tilting angle of the fuselage;

From the equation (1), the following approximate equation (2) can be obtained provided that the value $T/(2\Omega)$ is larger than zero and small in relation to one, and the value $(\dot{\theta}+\dot{\phi})/\Omega^2$ is small in relation to value $(\theta+\phi)$.

$$\delta = T(\dot{\theta}+\dot{\phi}-\delta) \quad (2)$$

where δ is the angle of inclination of the swash plate with respect to the rotor mast which is proportional to the angle of actuation of the control stick.

Further, in the system shown in FIG. 3, the following relations are established.

$$\ddot{\theta} = K(\delta - \theta) \quad (3)$$

From the equations (2) and (3);

$$\dddot{\theta} + T\ddot{\theta} + K\dot{\theta} = KT\dot{\psi} \quad (4)$$

Considering a case wherein the control stick or the swash plate is actuated from zero to an angle $\psi_0$, the solution of the equation (4) becomes as follows: where $T^2/4$ is small in relation to K, that is, $T^2/4 << K$, $$\left. \begin{array}{l} \theta = T\phi_0 \left( t - \dfrac{T}{K} - \dfrac{e^{-\frac{T}{2}t}}{\sqrt{K}} \sin\sqrt{K}\,t \right) \\ \dot{\theta} = T\phi_0 \left( 1 - e^{-\frac{T}{2}t} \cos\sqrt{K}\,t \right) \\ \ddot{\theta} = T\phi_0 \sqrt{K}\, e^{-\frac{T}{2}t} \sin\sqrt{K}\,t \end{array} \right\} \quad (5)$$

where $T^2/4$ is large in relation to K, that is, $T^2/4 >> K$, $$\left. \begin{array}{l} \theta = T\phi_0 \left( t - \dfrac{T}{K} + \dfrac{T}{K} e^{-\frac{K}{T}t} \right) \\ \dot{\theta} = T\phi_0 \left( 1 - e^{-\frac{K}{T}t} \right) \\ \ddot{\theta} = \phi_0 K \left( e^{-\frac{K}{T}t} - e^{-Tt} \right) \end{array} \right\} \quad (6)$$

In the equations (5), since the value T/2 is considered as being relatively large, the angular velocity $\dot{\theta}$ reaches a constant value $T\psi_0$ within a relatively short period. As one example of the present invention, the value T may be 4 and the value K may be 50. In this case, the angular velocity $\dot{\theta}$ changes as shown by the curve (a) in FIG. 5. However, in the equations (6), since the value K/T is considered as being very small and nearly zero, the angular velocity $\dot{\theta}$ can reach the aforementioned constant value $T\psi_0$ only after a substantial time. In a typical example of a conventional helicopter, the value T may be 20 and the value K may be 4. In this case, the angular velocity $\dot{\theta}$ changes as shown by the curve (b) in FIG. 5.

Figure 5:
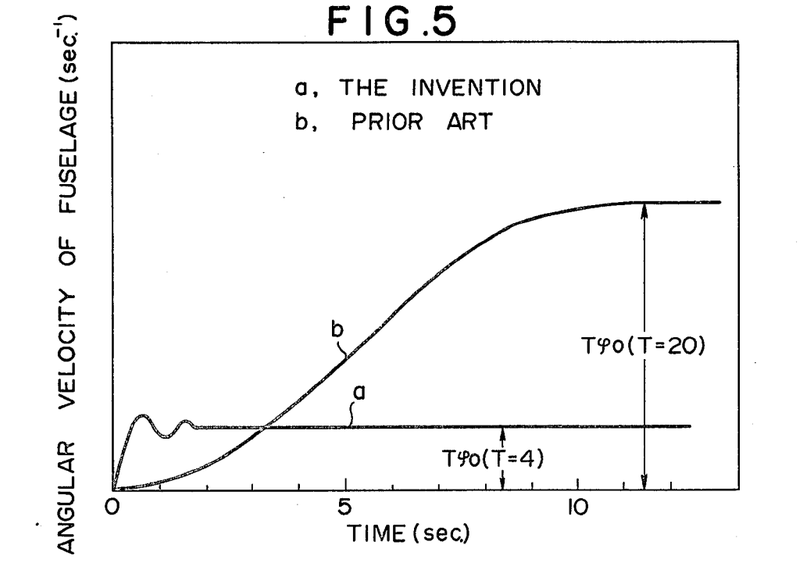
FIG. 5 is a diagram showing the response characteristics of aircrafts.

It will therefore be seen that, in the case where the value $T^2/4$ is small in relation to K, the ultimate angular velocity of the movement of the helicopter fuselage as obtained in response to the actuation of the swash plate by a predetermined angle is smaller than that in the case where the value $T^2/4$ is large in relation to the value K, and the ultimate angular velocity can be attained much faster in the former case than in the latter case.

Referring now to the inclination of the rotor with respect to the rotor mast, which may be represented by the value $(\delta - \theta)$, the following relations can be obtained from the equations (3), (5) and (6), where the value $T^2/4$ is small in relation to the value K, that is, $T^2/4 << K$, $$\frac{\delta - \theta}{\phi_0} = \frac{T}{\sqrt{K}} e^{-\frac{T}{2}t} \sin\sqrt{K}\,t \quad (7)$$

where the value $T^2/4$ is large in relation to the value K, that is, $T^2/4 >> K$, $$\frac{\delta - \theta}{\phi_0} = e^{-\frac{K}{T}t} - e^{-Tt} \quad (8)$$

In the equation (7), the value T/2 is considered as being relatively large, the value $(\delta-\theta)/\phi_0$ is relatively rapidly damped to zero. This means that, with the condition under discussion, the angle of inclination of the rotor with respect to the rotor mast can be maintained very small.

In the equation (8), however, the value K/T is considered as being very small and nearly zero, the value $(\delta-\theta)/\phi_0$ decreases to zero only after a substantial time. This will mean that when the swash plate is actuated through the control stick by the predetermined angle $\phi_0$, the rotor plane is at first tilted with respect to the rotor mast and, only after a substantial time delay, the fuselage with the rotor mast starts to move in the direction of the rotor inclination.

Figure 4:
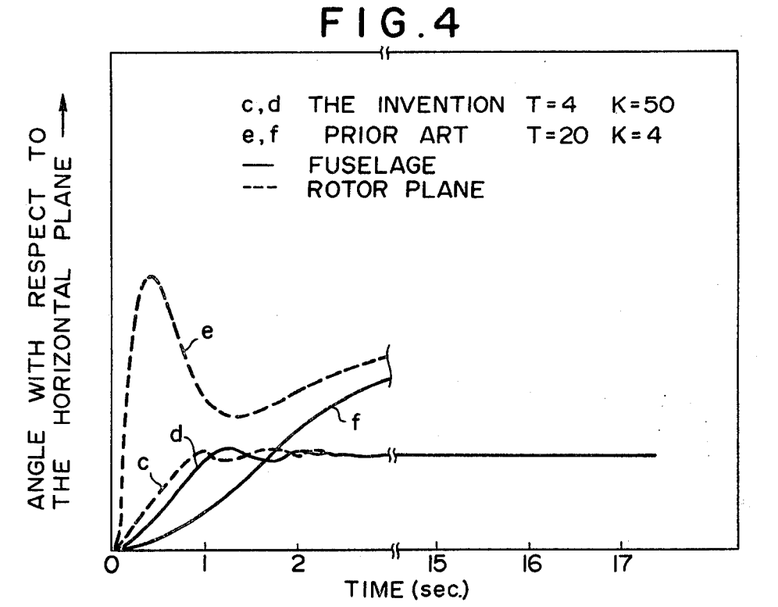
FIG. 4 is a diagram showing the relationship between the tilting movement of the rotor and corresponding movement of the fuselage.

Thus, in the former case, that is, in one example of the present invention, the fuselage of the helicopter quickly responds to the actuation of the swash plate. The movement δ of the rotor plane and that θ of the fuselage are shown in FIG. 4. In the drawing, the dotted line C shows the angle δ in accordance with said one example of the present invention, the solid line d the angle θ of the example, the dotted line e the angle δ in the conventional one and the solid line f the angle θ in the conventional one.

In FIG. 4, it will be seen that, in the example of the present invention, the fuselage of the helicopter quickly responds to the inclining movement of the rotor plane. Thus, the controllability of the helicopter is appreciably improved. Although the discussion has been made with respect to a specific example wherein the value $T^2/4$ is much smaller than the value K, the inventor has found that a significant improvement on the controllability can be accomplished with the ratio $2\sqrt{K}/T$ greater than 0.8, more preferably, greater than 1.0.

Referring now to FIGS. 6 through 9 of the drawings which show one practical embodiment of the present invention, the helicopter shown therein includes a fuselage 11 constituted by a pipe-framework and having an engine 12 mounted thereon. The fuselage 11 further has a hollow mast 13 which is secured thereto so as to extend substantially vertically. A rotor drive shaft 23 extends coaxially in the mast 13 and operatively connected with the engine 12 through an appropriate clutch and transmission mechanism (not shown) so as to be driven by the engine.

Figure 6:
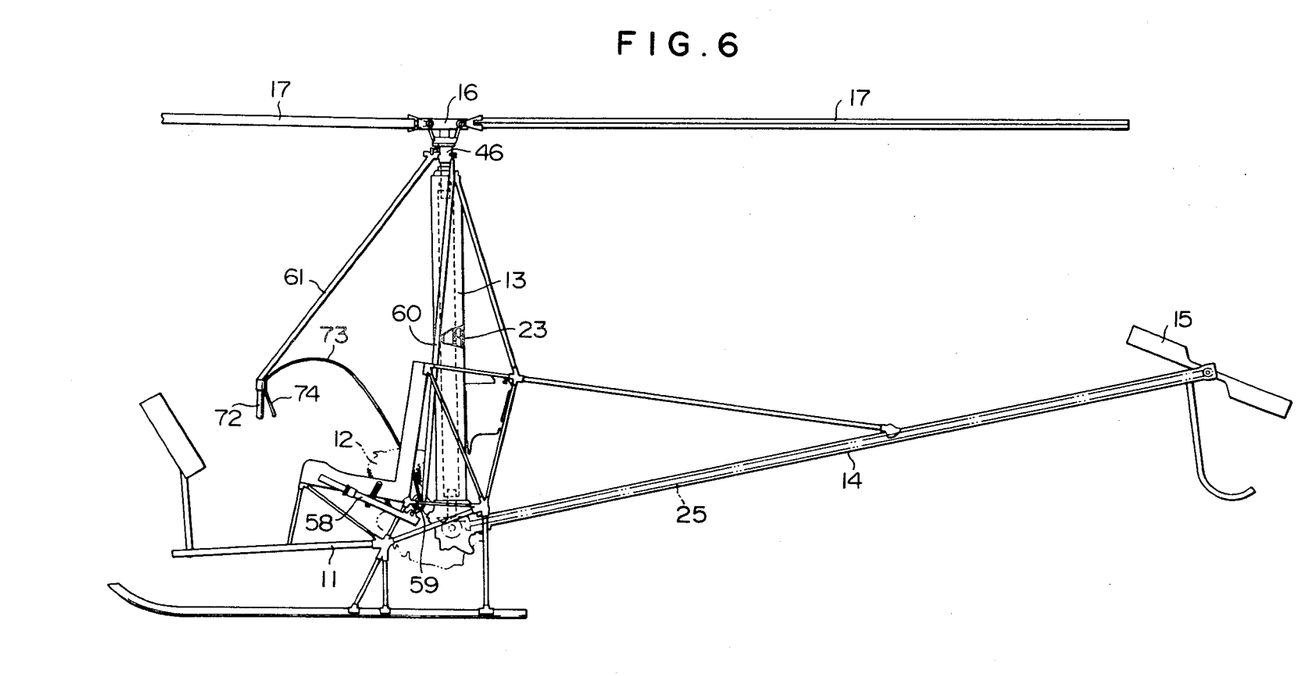
FIG. 6 is a side elevational view of a helicopter in accordance with another embodiment of the present invention.

A tail boom 14 extends from the fuselage toward aft and supports a tail rotor 15. The tail rotor 15 is connected through a drive shaft 25 with the engine 12 to be driven thereby.

Figure 7:
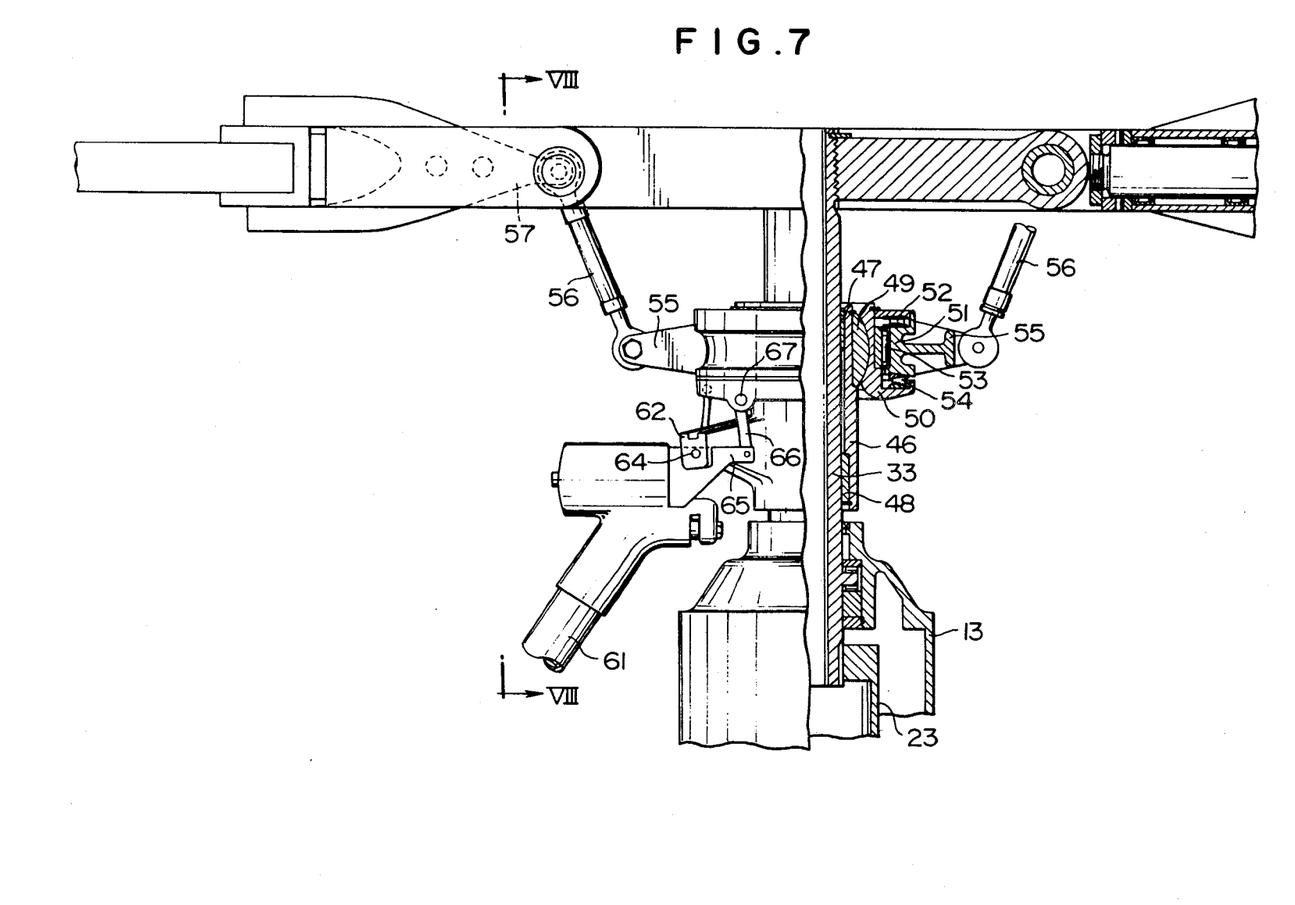
FIG. 7 is a fragmentary partially sectioned view particularly showing the swash-plate mechanism employed in the helicopter shown in FIG. 6.
Figure 8:
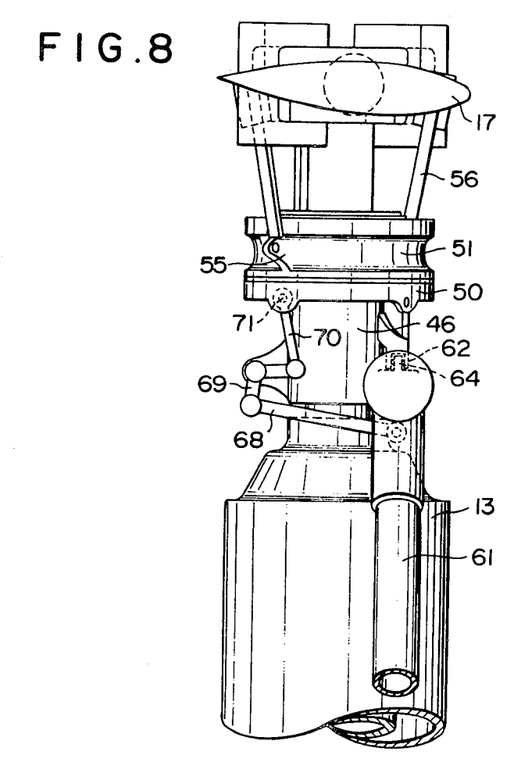
FIG. 8 is a view as seen in the direction of arrow VIII—VIII in FIG. 7.

At the upper end of the rotor drive shaft 23, there is mounted a rotor hub 16 which carries a pair of diametrically opposed rotor blades 17. Referring more specifically to FIG. 7, the rotor drive shaft 23 has a further shaft 33 which is secured to the upper end thereof so as to extend upwardly. At the upper end of the shaft 33, there is secured the aforementioned rotor hub 16 of substantially rectangular shape. Each rotor blade 17 is connected to the rotor hub 16 through a connecting member 40.

Figure 9:
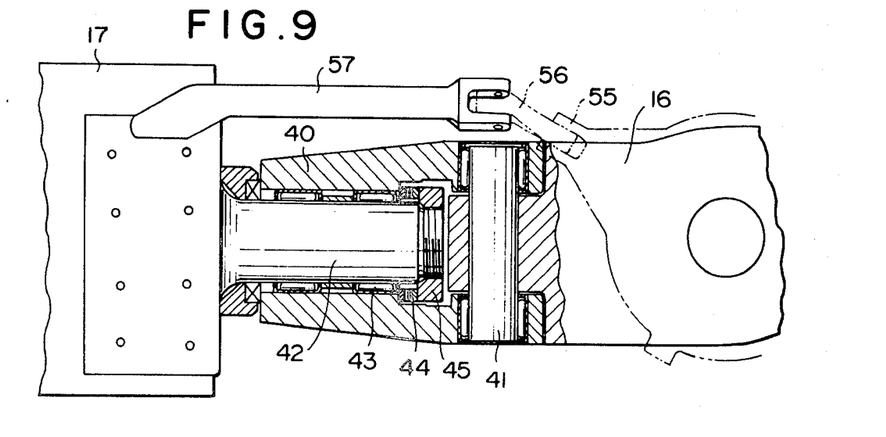
FIG. 9 is a fragmentary plan view of the rotor particularly showing the root portion of a blade.

As shown in FIG. 9, the connecting member 40 is connected through a flapping hinge pin 41 to one end of the rotor hub 16. The pin 41 extends substantially in a horizontal plane perpendicularly to the longitudinal axis of the rotor blade 17 so that the connecting member 40 is movable or swingable about the pin 41 in a substantially vertical plane.

The rotor blade 17 is provided at the end adjacent to the rotor hub 16 with a stub shaft 42 which extends radially inwardly of the rotor and is received by a bearing 43 for feathering movement about its longitudinal axis. Further, the stub shaft 42 is maintained against axial movement by means of a thrust bearing 44 and a nut 45. Thus, it will be seen that the rotor blade 17 is capable of feathering movement about its longitudinal axis and of flapping movement about the hinge pin 41. It should further be noted that the flapping hinge 41 is offset from the shaft 33 by a substantial distance.

On the shaft 33, there is mounted a sleeve 46 which is maintained stationary as hereinafter be described. For the purpose, the sleeve 46 is mounted on the shaft 33 through bearings 47 and 48. The sleeve 46 carries a part-spherical bearing 49 on which a swash plate 50 is mounted for inclining movement with respect thereto.

The swash plate 50 carries a follower ring 51 which is rotatable by being mounted on the swash plate 50 through bearings 52, 53 and 54. The ring 51 has a pair of diametrically opposed lugs 55, each of which is connected through a feathering rod 56 with an arm 57 provided on the corresponding rotor blade 17.

Referring back to FIG. 6, the helicopter is provided with a collective pitch control lever 58 which is connected through a bell-crank 59 and a push-pull rod 60 with the sleeve 46 in such a manner that the sleeve 46 is vertically displaced through an actuation of the lever 58. Thus, it will be understood that, by effecting the vertical displacement of the sleeve 46 through the actuation of the control lever 58, the swash plate 50 and the ring 51 are also shifted vertically so that the leading edges of the rotor blades 17 are also vertically moved to change the pitch angles thereof.

The helicopter is further provided with a cyclic pitch control lever 61 which is mounted at one end on the sleeve 46 for lateral and longitudinal swinging movements. More specifically, the sleeve 46 is formed with a lug 62 which is connected through a spherical bearing 63 and a bolt 64 extending therethrough with the upper end of the lever 61. The upper end of the lever 61 has a rearward extension 65 which is connected through a rod 66 with the swash plate 50 at a point 67 located at the left side portion thereof. The upper end of the lever 61 is further connected at a point beneath the bolt 64 with a connecting rod 68 which is in turn connected through a bell-crank 69 and a further rod 70 with the swash plate 50 at a point 71 which is circumferentially spaced from the point 67 by an angle of 90°.

Thus, it will be understood that by laterally swinging the lever 61, the swash plate 50 is longitudinally inclined causing lateral tilting of the rotor plane as well known in the art. When the lever 61 is swung longitudinally, the swash plate 50 is inclined laterally so that a longitudinal tilting movement is produced in the rotor plane.

The lever 61 is further provided with a throttle control grip 72 which is adapted to actuate the throttle valve (not shown) of the engine 12 through a cable assembly 73. Further, the lever 61 is provided with a clutch actuating lever 74 for controlling the clutch between the engine 12 and the drive shaft 23.

In the embodiment, the rotor blades 17 may be constructed as shown in FIG. 2 from aluminum alloy by extrusion technique. Alternatively, they may be manufactured through any known method provided that the aforementioned requirements are met.

By way of examples, practical values in accordance with the present invention are compared with those in conventional helicopters in the following table.

As previously described, in accordance with the present invention, an improved controllability can be obtained by maintaining the ratio $2\sqrt{K}/T$ greater than 0.8, and a further improvement can be accomplished with the ratio $2\sqrt{K}/T$ greater than one. According to the analysis made by the inventor, when the ratio $2\sqrt{K}/T$ is determined as being greater than one, the tilt angle between the rotor mast and the axis of the rotor plane quickly converges to zero with certain hunting oscillations, so that the fuselage responds to the actuation of the swash plate very quickly.

| $\left(\frac{K}{1}\right)$ $(\frac{1}{S^2})$ | $\left(\frac{T}{1}\right)$ $(\frac{1}{S})$ | $\frac{2\sqrt{K}}{T}$ (1) | R (m) | C (mm) | b (1) | Ω (rpm) | W (kg) | I (kg·m·s²) | h (m) | H (mm) | Zo (10³ kg) | $I_R$ (kg·m·s²) | e (m) | $\frac{Z_oeb}{2}$ (Kgm) | (kgm) | (tip weight) (kg) |
|---|---|---|---|---|---|---|---|---|---|---|---|---|---|---|---|---|
| | | | | | | | | Prior Art | | | | | | | | |
| I  4 | 20 | 0.20 | 5.35 | 290 | 2 | 322 | 930 | 288 | 1.37 | | | 18.5 | 0 | 0 | 1274 | |
| II 8 | 15 | 0.38 | 5.08 | 330 | 2 | 382 | 1450 | 307 | 1.73 | | | 25.7 | 0 | 0 | 2509 | |
| | | | | | | | | Invention | | | | | | | | |
| I  50 | 4 | 3.54 | 3.5 | 140 | 3 | 293 | 270 | 15.8 | 1.2 | 2013 | 2.41 | 7.21 | 0.13 | 470 | 324 | 3 |
| II 30 | 10 | 1.095 | 4 | 140 | 2 | 380 | 250 | 21.9 | 1.2 | | 3.58 | 6.34 | 0.1 | 358 | 300 | 0.8 |

The invention has thus been shown and described with reference to specific examples, however, it should be noted that the invention is in no way limited to the details of the illustrated structures but changes and modifications may be made without departing from the scope of the appended claims. For example, although the foregoing descriptions have been made with respect to rotor systems having two rotor blades, the invention can also be applied to rotary wing aircrafts having rotor systems with three or more blades. Further, the concepts of the invention can also be applied to rotary wing aircrafts having rotor systems in which rotor blades are mounted for dragging movements.

I claim:

1. Rotary wing aircraft having a center of gravity and a pitching axis passing therethrough, said aircraft comprising a fuselage, engine means mounted on the fuselage, substantially vertical rotary driving shaft means mounted on the fuselage and connected with the engine means to be driven thereby, rotary means including a plurality of rotor blades, means for mounting said rotor blades on the rotor driving shaft means at least for flapping and feathering movements including flapping hinge means about which each said rotor blade conducts flapping movement, said flapping hinge means being offset radially outwardly from the rotating axis of the rotary driving shaft means, swash plate means for enabling collective and cyclic pitch control of the rotor blades, said aircraft being characterized by having physical values $$K = \frac{1}{I_o}\left(Wh + \frac{bz_oe}{2}\right) \text{ and } \frac{T^2}{4} = 0.032 \times \frac{C^2\rho_o^2\Omega_o^2R^8}{I_{R2}}$$

the ratio $(2\sqrt{K}/T)$ being not less than 1.0; where $I_o$ is moment of inertia of the aircraft about the pitching axis passing through said center of gravity;

W is weight of the aircraft under standard operating conditions;

h is height of the rotor means from said center of gravity;

b is number of the rotor blades;

Zo is centrifugal force which acts on the rotor blades at the rated operating angular velocity Ωo;

e is radial offset distance of axis of the flapping movement of the rotor blade from rotating axis of the rotor driving shaft means;

C is mean chord length of the rotor blade;

is density of air under a standard atmospheric condition;

R is radius of the rotor means; and $I_R$ is the moment of inertia of the rotor blade about the flapping hinge.

2. Rotary wing aircraft in accordance with claim 1 in which the ratio of the radial offset distance e to the radius of the rotor R is not less than 2.5 percent.

3. Rotary wing aircraft in accordance with claim 1 in which said rotor means includes at least three rotor blades.

4. Rotary wing aircraft in accordance with claim 1 in which each of said rotor blades has weight means provided at each tip end thereof.

5. Rotary wing aircraft in accordance with claim 1 in which K is not less than 25 1/sec².

6. Rotary wing aircraft in accordance with claim 1 in which said rotor blades are made of aluminum alloy extrusions.

7. Rotary wing aircraft in accordance with claim 1 in which the value T is not larger than 12 1/sec.

8. Rotary wing aircraft in accordance with claim 1 in which the ratio of the lift coefficient of said rotor blades relative to the attack angle is 5.73.

9. Rotary wing aircraft having a center of gravity and a pitching axis passing therethrough, said aircraft comprising a fuselage, engine means mounted on the fuselage, substantially vertical rotary driving shaft means to be driven thereby; rotary means including a plurality of rotor blades, means for mounting said rotor blades on the rotor driving shaft means at least for flapping and feathering movements, including flapping hinge means about which each said rotor blade conducts flapping movement, said flapping hinge means being offset radially outwardly from the rotating axis of the rotary driving shaft means, swash plate means for enabling collective and cyclic pitch control of the rotor blades, said aircraft being characterized by having physical values $$K = \frac{1}{I_o}\left(Wh + \frac{bz_oe}{2}\right) \text{ and } \frac{T^2}{4} = 0.032 \times \frac{C^2\rho_o^2\Omega_o^2R^8}{I_{R2}}$$

the ratio $(2\sqrt{K}/T)$ being not less than 1.0 and a physical value Wh which is smaller than $Z_oeb$; wherein:

Io is moment of inertia of the aircraft about the pitching axis passing through the center of gravity;

W is weight of the aircraft;

h is height of the rotor means from the center of gravity;

b is number of the rotor blades;

Zo is centrifugal force which acts on the rotor blade at the rated operating angular velocity Ωo;

e is radial offset distance of axis of the flapping movement of the rotor blade from rotating axis of the rotor driving shaft means;

C is mean chord length of the rotor blade;

ρo is density of air under a standard atmospheric condition;

R is radius of the rotor means; and $I_R$ is the moment of inertia of the rotor blade about the flapping hinge.

* * * * *